United States Patent
Tsai et al.

(10) Patent No.: US 11,039,370 B2
(45) Date of Patent: Jun. 15, 2021

(54) AUTOMATIC ROUTING BASED ON DUAL-CAPABILITY WI-FI SYSTEMS

(71) Applicant: HEWLETT-PACKARD DEVELOPMENT COMPANY, L.P., Spring, TX (US)

(72) Inventors: Ming-Shien Tsai, Taipei (TW); Yi-Kang Hsieh, Taipei (TW); Chung-Chun Chen, Taipei (TW); Elizabeth Lu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 3 days.

(21) Appl. No.: 16/481,308

(22) PCT Filed: Jul. 19, 2017

(86) PCT No.: PCT/US2017/042799
§ 371 (c)(1),
(2) Date: Jul. 26, 2019

(87) PCT Pub. No.: WO2019/017932
PCT Pub. Date: Jan. 24, 2019

(65) Prior Publication Data
US 2021/0136654 A1    May 6, 2021

(51) Int. Cl.
*H04W 40/12* (2009.01)
*H04W 40/34* (2009.01)
*H04W 40/04* (2009.01)

(52) U.S. Cl.
CPC .......... *H04W 40/12* (2013.01); *H04W 40/04* (2013.01); *H04W 40/34* (2013.01)

(58) Field of Classification Search
None
See application file for complete search history.

(56) References Cited

U.S. PATENT DOCUMENTS

| 8,654,869 B2 | 2/2014 | Jones et al. |
| 9,191,086 B2 | 11/2015 | Pochop et al. |

(Continued)

FOREIGN PATENT DOCUMENTS

| WO | WO-2009147662 | 12/2009 |
| WO | WO-2011114330 | 9/2011 |
| WO | WO-2014055294 | 4/2014 |

OTHER PUBLICATIONS

Arris Wireless Solutions, 2011.

*Primary Examiner* — Brian S Roberts
(74) *Attorney, Agent, or Firm* — HPI Patent Department

(57) ABSTRACT

A system and method are disclosed in which smart routing of a signal from a Wi-Fi device to an Access Point (AP) is performed by consulting a dynamic mesh network of measured path information between entities in a Wireless Local Area Network (WLAN). The WLAN consists of at least two possible paths between the Wi-Fi device and the AP, and each path may include one or more sub-paths. The measured path information consists of Received Signal Strength Indication (RSSI) and Quality Indication (QI) measurements. The dynamic mesh network is generated by APs performing beamforming operations with other APs in the WLAN and obtaining distinct RSSI and QI for each measured path. The measured RSSI and QI of each path, for both the 2.4 and 5.0 GHz bands, is added to the mesh network. Wi-Fi devices entering the WLAN consult the mesh network to determine the optimum connectivity path to the AP, thus avoiding routing through an unnecessary number of additional APs as well as APs with an already heavy payload.

14 Claims, 9 Drawing Sheets

(56) References Cited

U.S. PATENT DOCUMENTS

| | | | |
|---|---|---|---|
| 10,064,184 B1* | 8/2018 | Jorgovanovic | H04W 72/0453 |
| 10,932,262 B2* | 2/2021 | Erceg | H04L 69/323 |
| 2011/0032881 A1* | 2/2011 | Lee | H04B 7/0695 |
| | | | 370/328 |
| 2011/0068980 A1 | 3/2011 | Vered et al. | |
| 2011/0310748 A1* | 12/2011 | Mizugaki | H04L 45/42 |
| | | | 370/248 |
| 2012/0058775 A1 | 3/2012 | Dupray et al. | |
| 2013/0285855 A1 | 10/2013 | Dupray et al. | |
| 2014/0098738 A1* | 4/2014 | Matsumura | H04W 72/1231 |
| | | | 370/315 |
| 2015/0373636 A1 | 12/2015 | Karaca et al. | |
| 2016/0007278 A1 | 1/2016 | Gupta et al. | |

* cited by examiner

AUTOMATIC ROUTING BASED ON DUAL-CAPABILITY WI-FI SYSTEMS

BACKGROUND

Wi-Fi is a radio technology that enable wireless devices to connect to a Wireless Local Area Network (WLAN) and the Internet. In 1985, the Federal Communications Commission enabled unlicensed spectrum in the 2.4 GHz and 5 GHz spaces to be used. Technologies soon emerged to exploit the unlicensed spectrum, including garage door openers, cordless phones, Bluetooth, and then Wi-Fi.

The Institute of Electrical and Electronics Engineers (IEEE) soon developed an 802.11 standard for Wi-Fi, and several iterations of the 802.11 standard followed. The 802.11g standard, for example, allows devices to operate at up to 54 megabits per second (Mbps); 802.11n increases the operating rate to up to 450 Mbps in the 2.4 GHz band, but also supports operations in the 5 GHz band. Since 2013, the 802.11ac standard (known colloquially as "gigabit Wi-Fi") operates solely in the 5 GHz band to achieve maximum data rates of up to 1.3 GHz. Most smartphones and laptops sold today support both 802.11n and 802.11ac.

As expected, there are differences between 802.11n and 802.11ac. Operations at the higher 5 GHz band are faster but operate at a lower range (distance) than those in the lower 2.4 GHz band. Both 802.11n and 802.11ac support beamforming, but beamforming implementation is more likely in 802.11ac devices, as the 802.11ac specification implements a simpler version of beamforming. Both technologies support multiple antenna operations, although multiple antennas are more likely at the router (Access Point, AP) than at the cellphone or laptop (which may be an AP, a mobile station (STA or client), or both).

BRIEF DESCRIPTION OF THE DRAWINGS

Certain examples are described in the following detailed description and in reference to the drawings, in which.

DETAILED DESCRIPTION

The techniques illustrated herein are directed to a system and method in which smart routing of a signal from a Wi-Fi device to an Access Point (AP) is performed by consulting a dynamic mesh network of measured path information between entities in a Wireless Local Area Network (WLAN). The WLAN consists of at least two possible paths between the Wi-Fi device and the AP, and each path may include one or more sub-paths. The measured path information consists of Received Signal Strength Indication (RSSI) and Quality Indication (QI) measurements. The dynamic mesh network is generated by APs performing beamforming operations with other APs in the WLAN and obtaining distinct RSSI and QI for each measured path. The measured RSSI and QI of each path, for both the 2.4 and 5.0 GHz bands, is added to the mesh network. Wi-Fi devices entering the WLAN consult the mesh network to determine the optimum connectivity path to the AP, thus avoiding routing through an unnecessary number of additional APs as well as APs with an already heavy payload.

Figure 1:
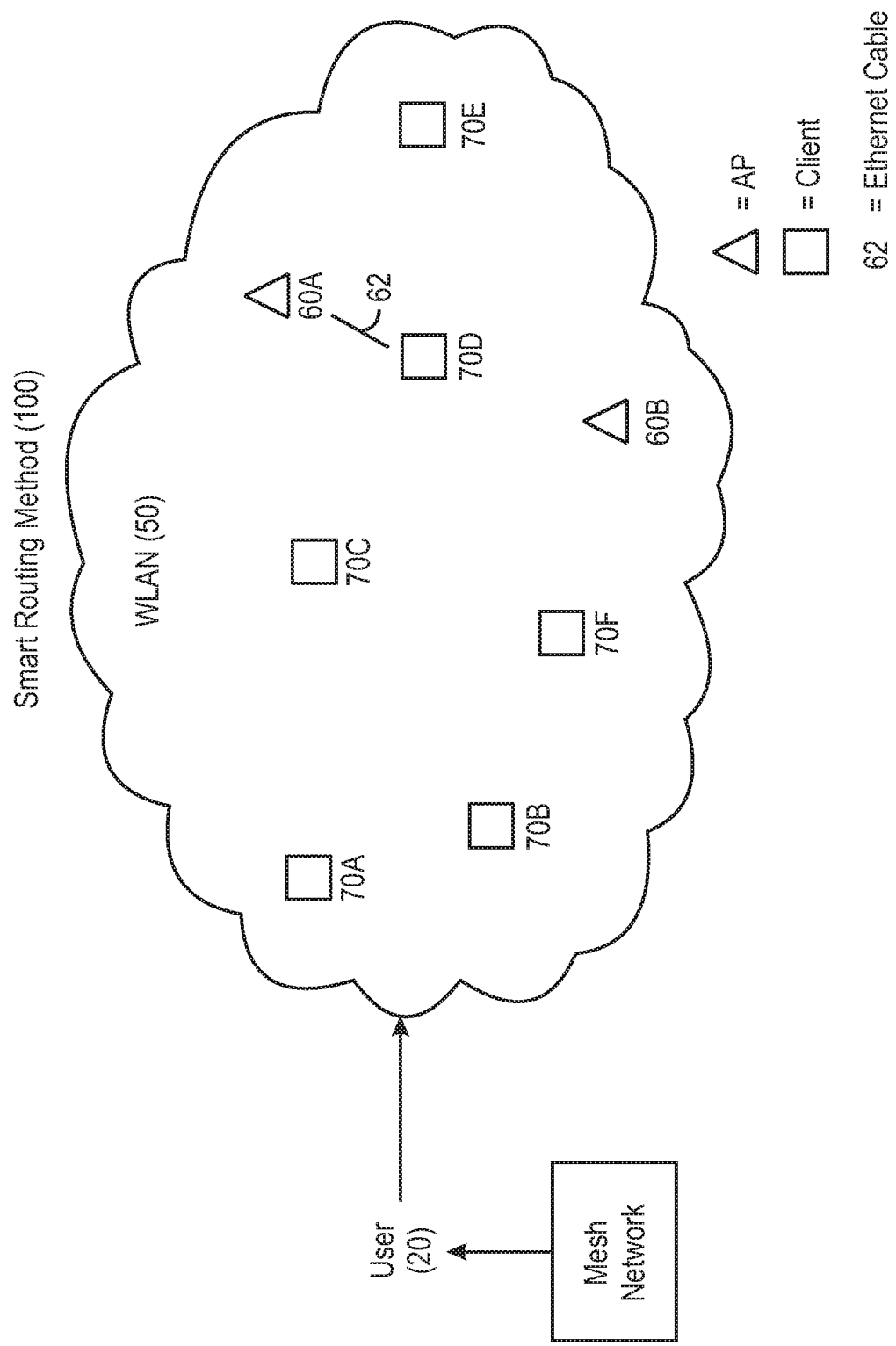
FIG. 1 is a simplified diagram of a smart routing method, in accordance with examples of the present technique.

In accordance with examples of the present technique, FIG. 1 is a simplified block diagram of a smart routing method 100. The smart routing method 100 is to be used by a user 20 entering a WLAN 50, in which the WLAN 50 consists of Access Points (APs), such as routers, and mobile stations (clients), such as laptops, cellphones, smartphones, and other wireless mobile devices. According to the smart routing method 100, the user 20 consults a mesh network 200 to optimally connect to one of the APs in the WLAN 50.

As illustrated in FIG. 1, the WLAN 50 is populated by two APs 60A and 60B (collectively, "APs 60") and multiple mobile stations or clients 70A-G (collectively, "clients 70"). In WiFi, wireless devices can operate as either APs or clients, but for simplicity of illustration, the wireless devices are referred to herein simply as clients. One client 70D is connected to AP 60A by way of an Ethernet cable 62, but all other communication between the entities shown in FIG. 1 are via wireless signals.

The user 20 is a wireless device, such as a laptop, smartphone, or cellphone, and desires to be connected to an AP in the WLAN 50. By performing scanning operations, the user 20 can route through the nearest client 70A, then route through client 70C, and make a wireless connection to the AP 60A. Or, the user can perform scanning operations to route through client 70B, then route through client 70F, and make a wireless connection to the AP 60B. The trouble is, the user 20 doesn't know the payloads of each of these devices. One client may be downloading a streaming video. Another client may be idle. A person or object may be between the user 20 and a third client, thus obstructing a connection between the user and the client. Examples herein provide that, by accessing the mesh network 200, user 20 avoids the guesswork associated with making an optimum connection in the WLAN 50.

Figure 2:
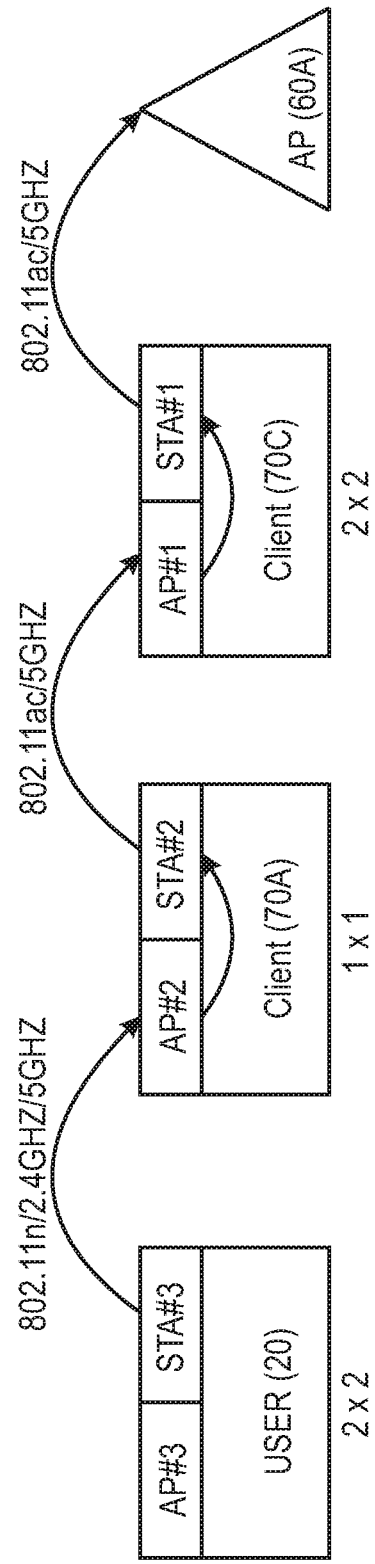
FIG. 2 is an illustration of routing between a user and an AP in the WLAN consisting of multiple hops, in accordance with examples of the present technique.

FIG. 2 illustrates the problem with more specificity. The user 20, entering the WLAN 50 performs a scanning operation to determine the available APs, discovers the client 70A and connects to its AP (denoted AP #2). The wireless devices described herein are known as dual WLAN, meaning they include one module/chipset that performs as a WLAN STA (client) and a second module/chipset that performs as a WLAN AP. Thus, in FIG. 2, all clients, including the user 20, include both a WLAN STA and a WLAN AP. Thus, a connection is first made between the user 20 (via STA #3) and the client 70A (via AP #2). Next, from within the client 70A, data will be routed from AP #2 to STA #2, as indicated by the arrow inside the client 70A.

Next, the client 70A will perform a scanning operation to connect to the next nearest AP, discovers the client 70C, and connects to its AP #1. Within the client 70C, data will be routed from AP #1 to STA #1, as indicated by the arrow inside the client 70C. Finally, the client 70C will perform a scanning operation to connect to the AP 60A (the final destination AP).

In addition to the above operations, the capability of each laptop is considered. In the example of FIG. 2, the user 20 and the client 70C are 2×2 devices, meaning they each have two transmit and two receive antennas, while the client 70A is a 1×1 device (one transmit and one receive antenna). Further, the user supports 802.11 n operations, which can occur at both 2.4 GHz and 5.0 GHz, while the clients 70A and 70C support 802.11ac operations (which only take place in the 5.0 GHz band). Thus, even if the user is an 802.11ac device connecting to an 802.11ac AP, an intermediate hop to an 802.11n device will negatively impact throughput. Similarly, a user having a 2×2 device connecting to a 2×2 AP will experience a loss of throughput if an intermediate hop to a 1×1 device occurs.

FIG. 2 thus illustrates a multi-part or multi-hop routing operation by the user 20 to obtain connection to the AP 60A. The routing operation essentially connects the user 20 to the nearest AP, then connects to the AP adjacent to the nearest AP, and these operations are repeated until the destination AP is reached. It may be the case, however, that one of the clients in the path is engaged in an operation with a heavy payload, such as video streaming. Or, there may be interference in the path between client 70A and client 70C that makes the multi-hop routing sub-optimal. Or, there may be another path in the WLAN 50, whether a direct route, or a multi-hop route, that would provide a better quality of connectivity between the user 20 and the AP 60A. Finally, routing through several wireless devices can result in long latency issues for the user 20.

Figure 3:
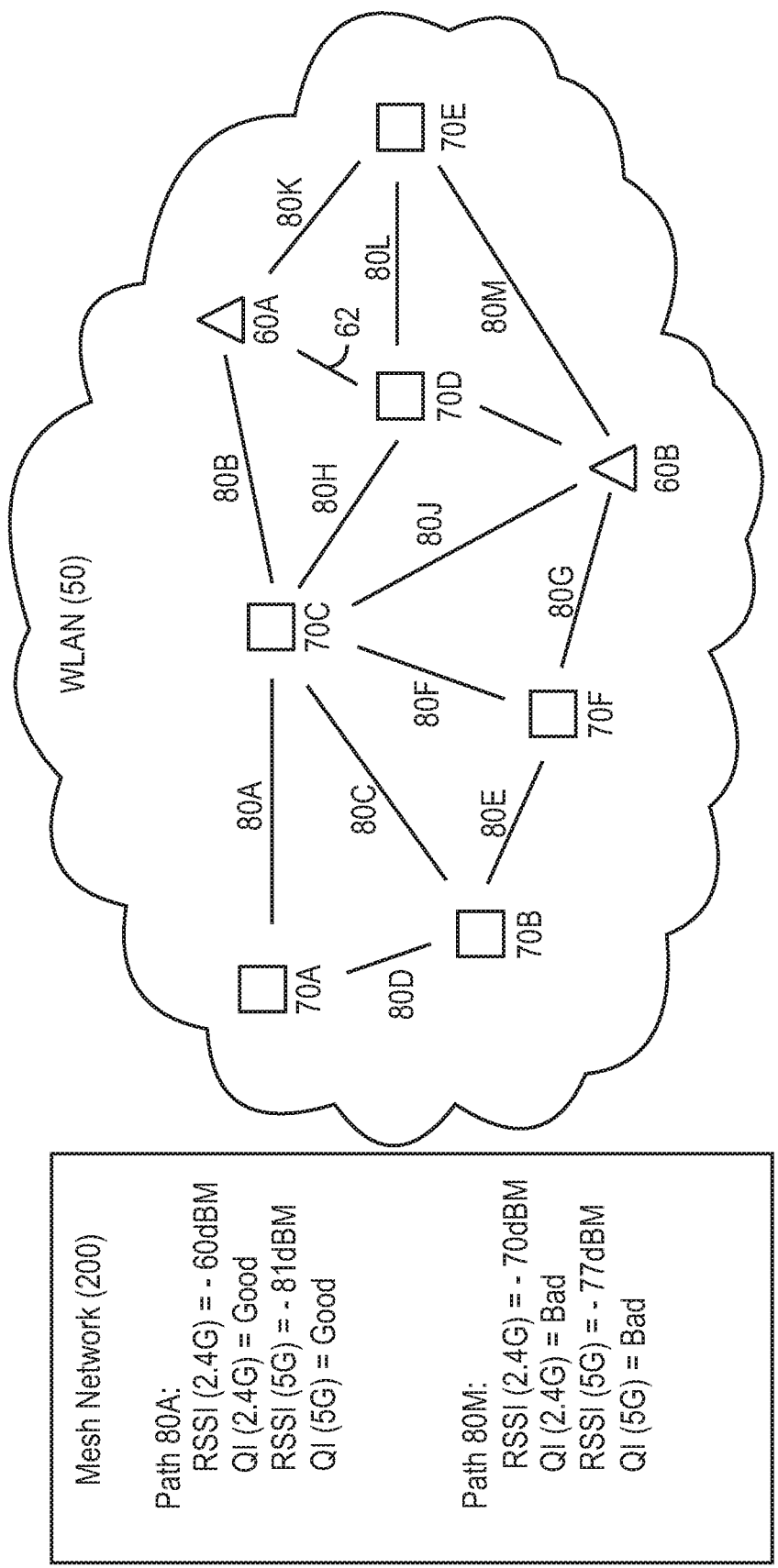
FIG. 3 is an illustration of the WLAN of FIG. 1, along with paths between wireless devices, in accordance with examples of the present technique.

FIG. 3 illustrates the WLAN 50 of FIG. 1 in more detail. As before, the WLAN 50 includes two APs 60A and 60B, as well as seven clients 70A-70G. Also shown are paths 80A-80M (collectively, "paths 80") between entities in the WLAN 50. For example, a path 80A is disposed between client 70A and client 70C. In FIG. 3, for ease of illustration, some paths between some entities are not indicated.

The characteristics of these paths 80, specifically, the Received Signal Strength Indication (RSSI) and Quality Indication (QI) measurements, are the basis for the mesh network 200. In one example, measurements are taken periodically by wireless devices in the WLAN 50, and are then used to update the mesh network 200. Thus, the characteristics (RSSI and QI) of path 80A is to be measured by the client 70A by beamforming a signal toward the client 70C; alternatively, the client 70C may transmit a beamforming signal toward the client 70A. Measurements at both the 2.4 GHz band and the 5.0 GHz band are taken, with the results provided to the mesh network 200.

In one example, the measurements are obtained by performing beamforming operations. Beamforming is supported under both 802.11n and 802.11ac, but is expected to become more widespread in 802.11ac implementations.

Figure 4:
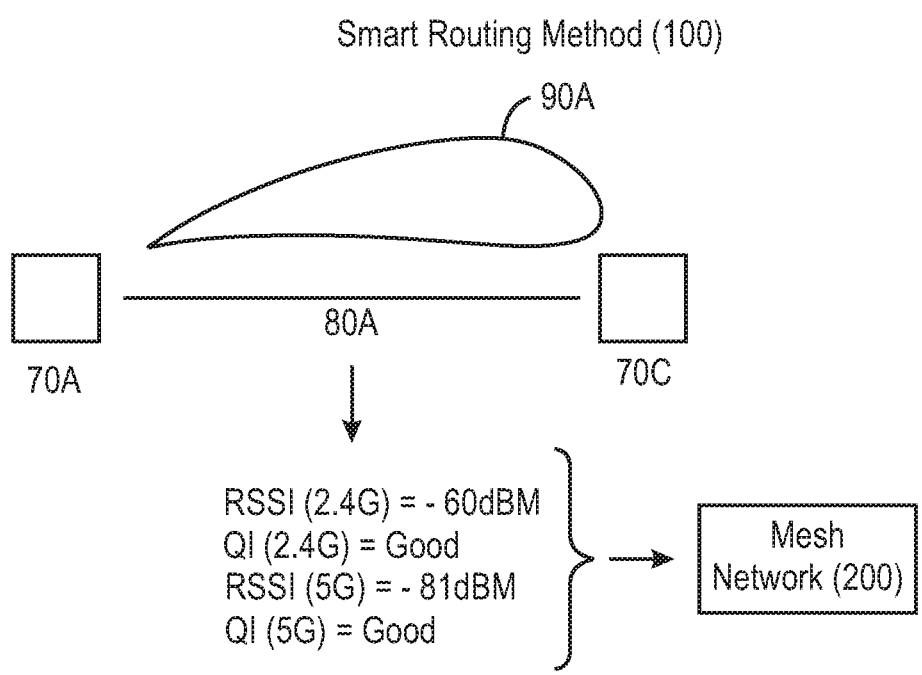
FIG. 4 illustrates how beamforming between two wireless devices is employed by the smart routing method of FIG. 1 to populate the mesh network, in accordance with examples of the present technique.

FIG. 4 illustrates how the smart routing method 100 uses beamforming to populate the mesh network 200 with RSSI and QI information for a given path of the WLAN 50. As shown, a beamforming operation 90, initiated by the client 70A, is directed toward the client 70C. The beamforming operation 90 used to generate the RSSI/QI measurements for path 80A and thus update the mesh network 200. Beamforming is a mechanism by which, rather than transmitting a signal in all possible directions (omnidirectional transmission), the signal transmission occurs in a specific direction. In FIG. 4, the client 70A is beamforming toward the client 70C, along the path 80A. Measurements of both RSSI and QI are obtained during the beamforming operation 90A, at both 2.4 GHz and 5.0 GHz, thus providing four data results about the path 80A. The RSSI and QI at both frequency bands are then added to the mesh network 200 for the path 80A.

Optimally, the operations of FIG. 4 are repeated for all wireless entities in the WLAN 50. The mesh network 200 is thus a database consisting of the four data results for each path 80 in the WLAN. In one example, the mesh network 200 is dynamic, such that its contents are periodically being updated: as new RSSI and QI calculations are obtained for a given path 80, older RSSI and QI measurements are replaced with more current ones. In this manner, the mesh network 200 maintains a real-time or near-real-time database of path characteristics for the WLAN 50.

Figure 5:
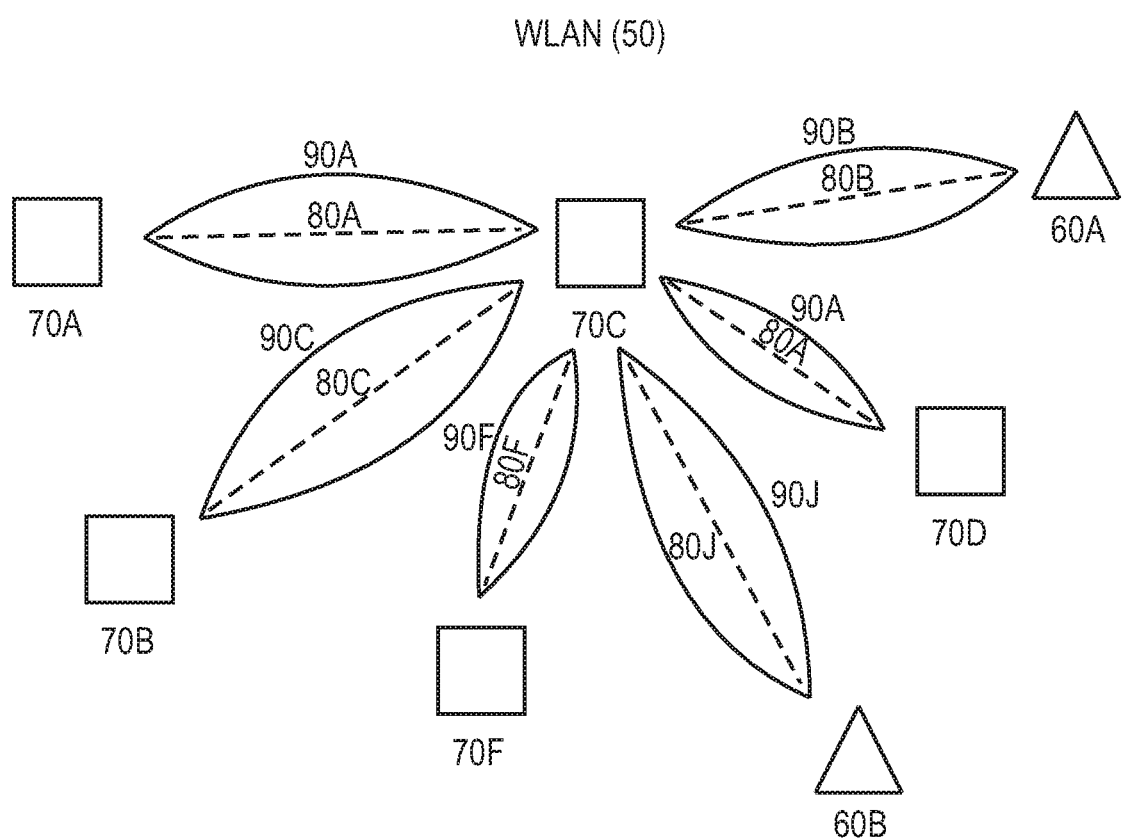
FIG. 5 is an illustration of a single wireless device performing beamforming operations on adjacent wireless devices, with measurements obtained used to update the mesh network, in accordance with examples of the present technique.

FIG. 5 illustrates how the smart routing method 100 enables a wireless device to update the mesh network 200 by performing beamforming operations with adjacent wireless devices, in accordance with examples of the present technique. In FIG. 5, the mesh network 200 is updated from the perspective of a single wireless device, in this case, client 70C. As in previous figures, the WLAN 50 consists of two APs 60A and 60B, as well as seven clients 70A-70G. An Ethernet connection 62 exists between the client 70D and the AP 60A. By performing distinct beamforming operations, the client 70C obtains RSSI and QI measurements of several paths 80 in the WLAN 50. Beamforming operation 90A measures the RSSI and QI for path 80A between client 70C and client 70A; beamforming operation 90B measures the RSSI and QI for path 80B between client 70C and AP 60A; beamforming operation 90J measures the RSSI and QI for path 80J between client 70C and AP 60B, and so on.

Recall from FIG. 2 that the wireless devices making up the WLAN 50 may have different characteristics. While the wireless devices are dual W-Fi devices, meaning they may operate both as clients (STAs) and as APs, the devices may diverge in additional capabilities, such as whether they support 802.11n, 802.11ac, or both, whether they have one transmit and one receive antenna (1×1) or two transmit and two receive antennas, and whether they are operating in the 2.4 GHz or 5.0 GHz frequency band. The additional characteristics can affect the RSSI and QI for a given path 80, and may thus frustrate the ability of the user 20 to optimally connect to the WLAN 50.

Figure 6:
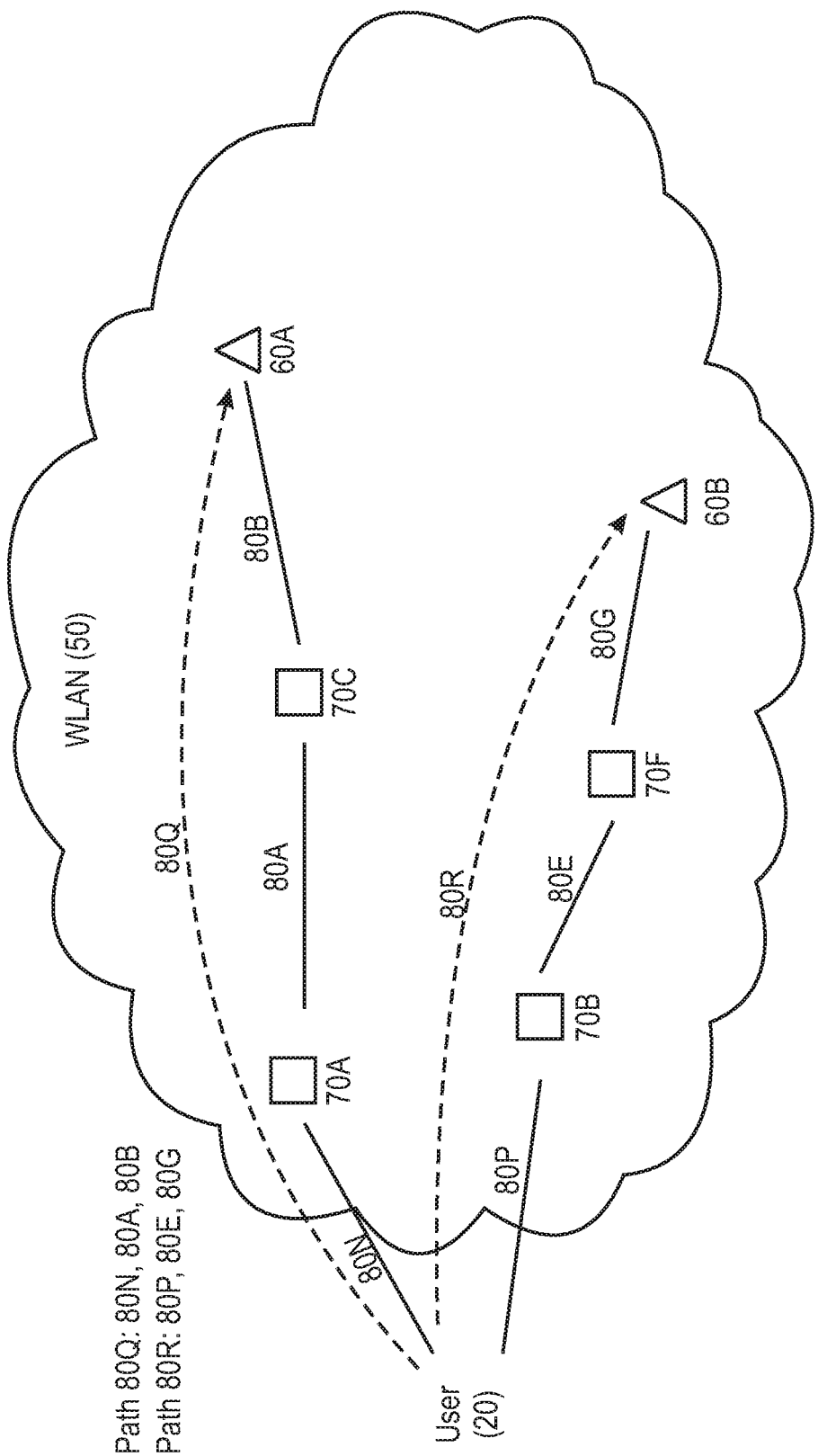
FIG. 6 is an illustration of how the user evaluates whether to connect to a first AP or a second AP in the WLAN using the smart routing method of FIG. 1, in accordance with examples of the present technique.

FIG. 6 illustrates the dilemma for the user 20 entering the WLAN 50. There are two APs 60A and 60B, and connecting to either is a multiple-hop transmission. A first option for the user 20 is a path 80Q (shown with dotted line between the user and the AP 60A) and a second option for the user is a path 80R (shown with dotted line between the user and the AP 60B). Paths 80Q and 80R are virtual paths, they are not actually how signals would be transmitted between the user 20 and the AP 60A or AP 60B. Instead, the virtual paths 80Q and 80R illustrate that each AP connection option is a multi-hop transmission.

The path 80Q involves the user 20 connecting to the client 70A (path 80N), then the client 70A connecting to the client 70C (path 80A), then the client 70C connecting to the AP 60A (path 80B), much as is described in reference to FIG. 2, above. Alternatively, the path 80R involves the user 20 connecting to the client 70B (path 80P), then the client 70B connecting to the client 70F (path 80E), then the client 70F connecting to the AP 60B (path 80G).

Thus, the path 80Q is based on three paths, 80N, 80A, and 80B; path 80R is based on three paths, 80P, 80E, and 80G. The RSSI and QI for the path 80Q is not a simple summation of the RSSI and QI values for the paths 80N, 80A, and 80B. The calculations used to obtain RSSI and QI for the path 80Q are beyond the scope of this disclosure. Nevertheless, to obtain the RSSI and QI of the path 80Q involves the RSSI and QI of the paths 80N, 80A, and 80B. Assuming the user 20 is a wireless device with beamforming capability, the user 20 is nevertheless in a position to obtain RSSI and QI for path 80N, but not for paths 80A and 80B. Likewise, for the path 80R, the user 20 cannot obtain the RSSI and QI for paths 80E and 80G, but only for path 80P.

Instead, according to the smart routing method 100, the user 20 consults the mesh network 200 to obtain the measured RSSI and QI for paths 80A and 80B. This enables the user 20 to calculate the RSSI and QI for the path 80Q. Similarly, using by consulting the mesh network 200 to obtain the measured RSSI and QI for paths 80E and 80G, the user 20 is able to calculate the RSSI and QI for the path 80R. This enables the user 20 to make a comparison between paths 80Q and 80R before making a connection decision.

The example of FIG. 6 may be simplified. For example, if the client 70C is not in the WLAN 50, the virtual path 80Q would consist of two hops instead of three: user 20 to client 70A, then client 70A to AP 60A. Or, if additional clients are present in the WLAN 50, the virtual path 80Q could consist of four hops, five hops, and so on. At some point, however, routing through too many APs may be problematic. By consulting the mesh network 200 to calculate the RSSI and QI for the virtual paths, the user 20 is able to elect an optimum path, using the smart routing method 100.

Figure 7:
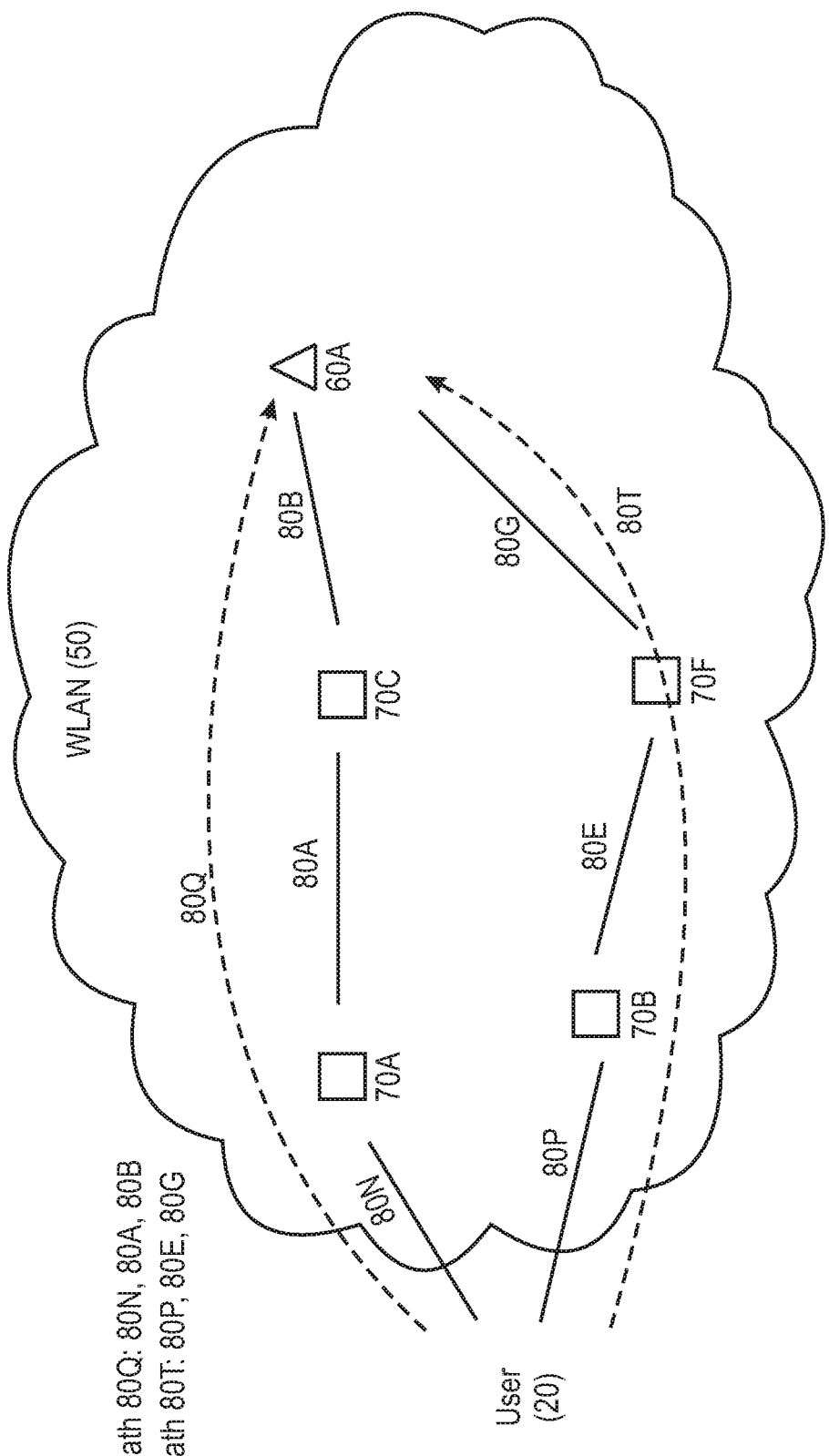
FIG. 7 is an illustration of how the user evaluates whether to connect to a single AP in the WLAN, where there is more than one path to the AP, using the smart routing method of FIG. 1, in accordance with examples of the present technique.

FIG. 7 is a second example, this time involving a single AP 60A, for the user 20 entering the WLAN 50. There are two paths 80Q and 80T available to the user 20, each of which is destined for the AP 60A, and connecting via either path is a multiple-hop transmission (the path 80Q is the same as in FIG. 6). A first option for the user 20 is the path 80Q (shown with dotted line between the user and the AP 60A) and a second option for the user is a path 80t (shown with dotted line between the user and the AP 60A). Paths 80Q and 80T are virtual paths, they are not actually how signals would be transmitted between the user 20 and the AP 60A. Instead, the virtual paths 80Q and 80S illustrate that each AP connection option is a multi-hop transmission.

The path 80Q is described above in reference to FIG. 6. Alternatively, the path 80S involves the user 20 connecting to the client 70B (path 80P), then the client 70B connecting to the client 70F (path 80E), then the client 70F connecting to the AP 60A (path 80S).

Thus, the path 80Q is based on three paths, 80N, 80A, and 80B; path 80T is based on three paths, 80P, 80E, and 80S. To obtain the RSSI and QI of the path 80Q involves the RSSI and QI of the paths 80N, 80A, and 80B. Assuming the user 20 is a wireless device with beamforming capability, the user 20 is nevertheless in a position to obtain RSSI and QI for path 80N, but not for paths 80A and 80B. Likewise, for the path 80T, the user 20 cannot obtain the RSSI and QI for paths 80E and 80S, but only for path 80P. As with FIG. 6, the number of clients making up each possible virtual path may be smaller or larger than is illustrated.

Instead, according to the smart routing method 100, the user 20 consults the mesh network 200 to obtain the measured RSSI and QI for paths 80A and 80B. This enables the user 20 to calculate the RSSI and QI for the path 80Q. Similarly, using by consulting the mesh network 200 to obtain the measured RSSI and QI for paths 80E and 80S, the user 20 is able to calculate the RSSI and QI for the path 80T. This enables the user 20 to make a comparison between paths 80Q and 80S before making a connection decision. Thus, the smart routing method 100 is able to assist the user 20 in selecting among multiple paths, whether they are destined for the same AP (FIG. 7) or for different APs (FIG. 6).

Figure 8:
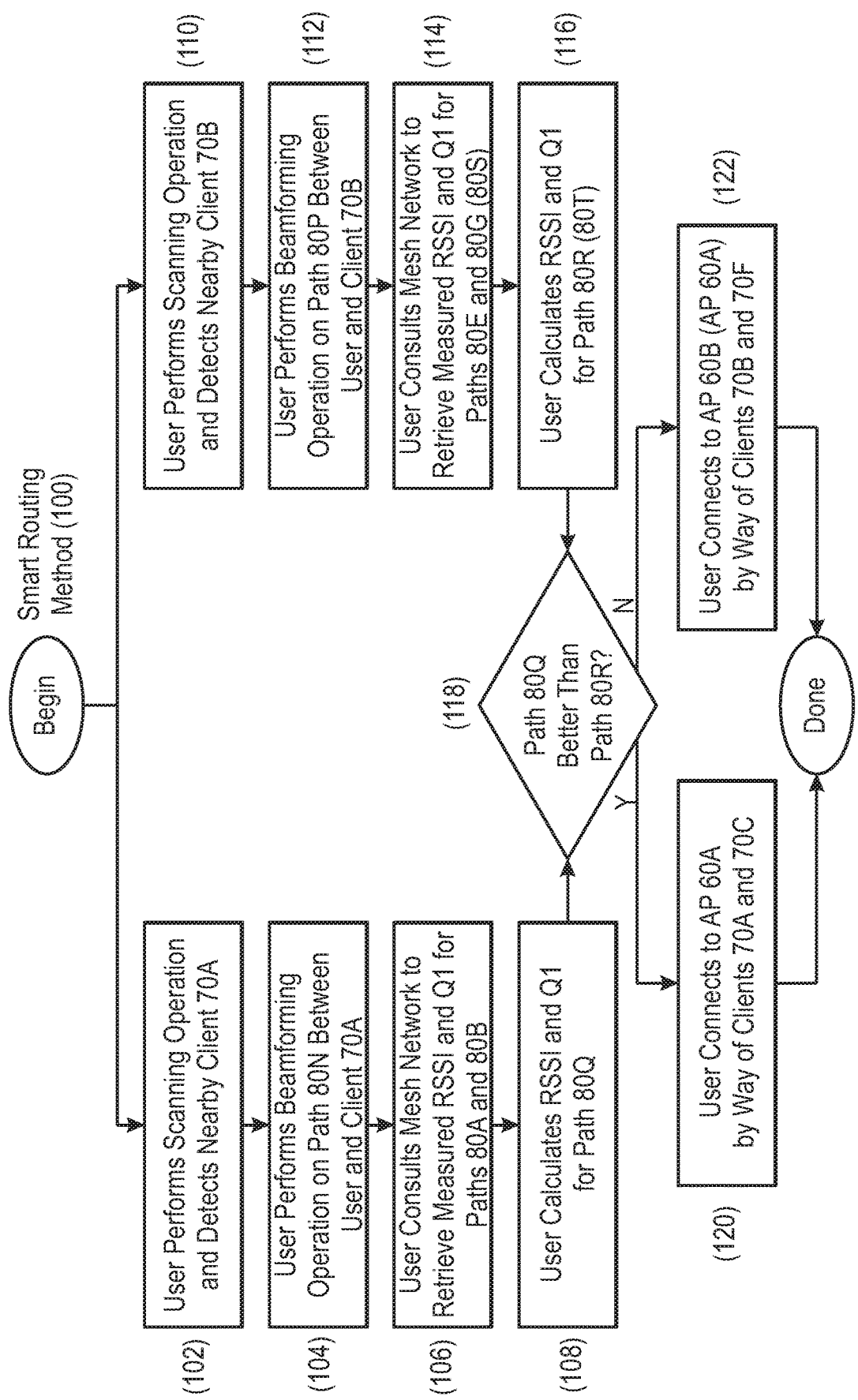
FIG. 8 is a flow diagram showing the operations of the smart routing method of FIG. 1, in accordance with examples of the present technique.

FIG. 8 is a flow diagram showing the operations of the smart routing method 100, in accordance with examples of the present technique. These operations illustrate decision-making by the user 20 when entering the WLAN 50 and being presented with the two options of FIG. 6, that is, whether to connect to the AP 60A (virtual path 80Q) or the AP 60B (virtual path 80R), or the two options of FIG. 7, in which two paths (virtual path 80Q or virtual path 80T) lead to the same AP 60A. The operations on the left side of the flow diagram (steps 102, 104, 106, and 108) are independent of operations on the right side of the flow diagram (110, 112, 114, and 116). The operations depicted in FIG. 8 may occur in an order other than is depicted.

In one implementation, the user 20 performs a scanning operation and detects the nearby client 70A (step 102). The user 20 performs a beamforming operation on the path 80N between itself and the client 70A (step 104). The user 20 determines that the virtual path 80Q between itself and the AP 60A is a multi-hop operation also involving client 70C, path 80A and path 80B. The user consults the mesh network 200 to retrieve the measured RSSI and QI information for paths 80A and 80B (step 106). Finally, the user calculates the RSSI and QI for the virtual path 80Q (step 108).

Similarly, in one example, the user performs a scanning operation for a second nearby client, client 70B (step 110). The user 20 performs a beamforming operation on the path 80P between itself and the client 70B (step 112). The user 20 determines that the virtual path 80Q between itself and the AP 60B is a multi-hop operation also involving client 70F, path 80E and path 80G. The user 20 consults the mesh network 200 to retrieve the measured RSSI and QI information for paths 80E and 80G (or 80S) (step 114). Finally, the user calculates the RSSI and QI for the virtual path 80R (or 80T) (step 116).

At this point, the user 20 has the information needed to optimally connect to either the AP 60A or the AP 60B (or just the AP 60A). The user evaluates the calculated RSSI and QI for the path 80Q and compares the result to the calculated RSSI and QI for the path 80R (step 118). If the path 80Q is better, the user 20 connects to the AP 60A by way of clients 70A and 70C (step 120). If, instead, the path 80R is better, the user 20 connects to the AP 60B (or 60A) by way of clients 70B and 70F (step 122). By making the mesh network 200 available, the smart routing method 100 enables the user 20 to make a decision to optimize its connection to the WLAN 50.

Figure 9:
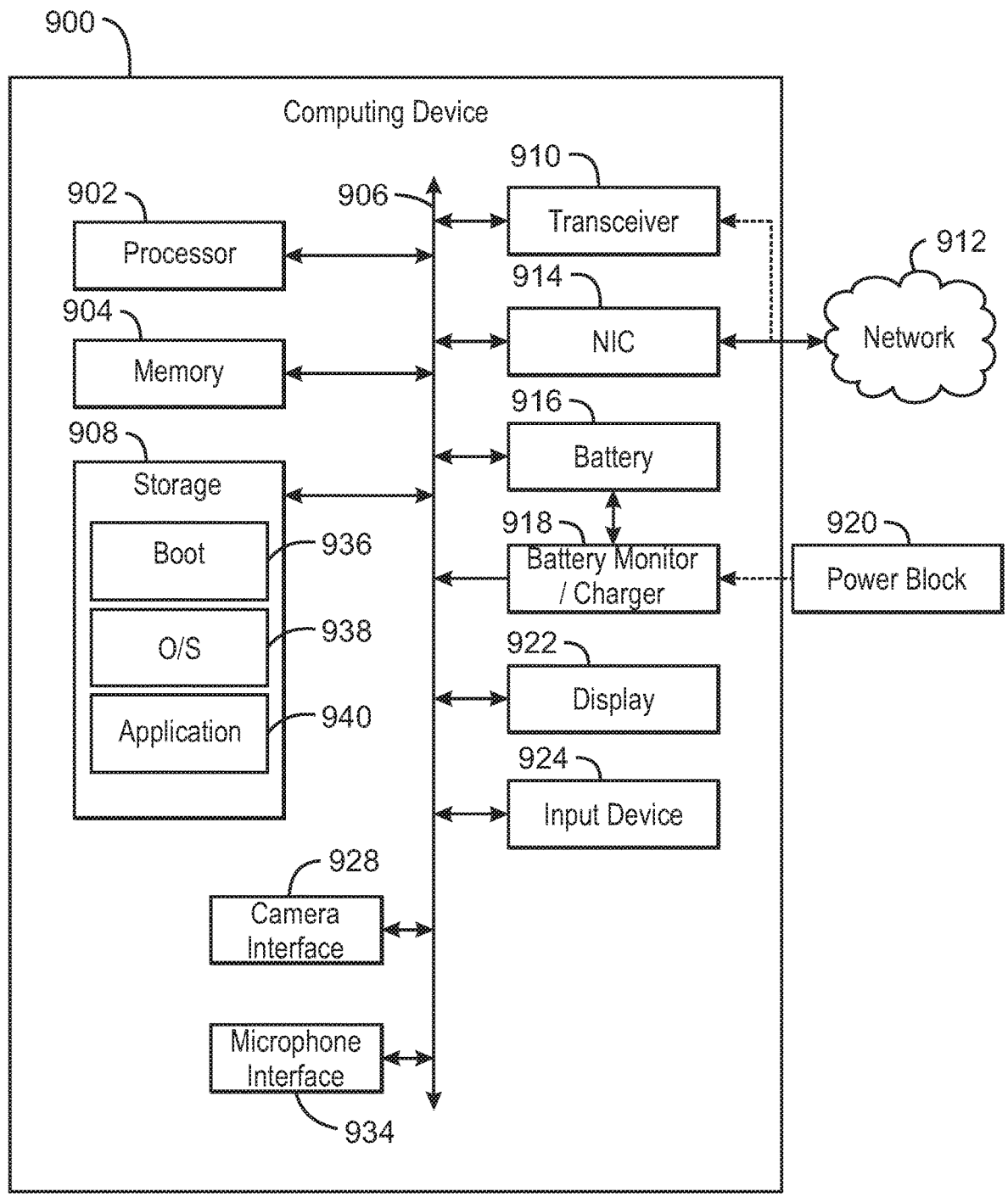
FIG. 9 is a system diagram of a system capable of implementing the smart routing method of FIG. 1, in accordance with examples of the present technique.

FIG. 9 is a block diagram of an example of components that may be present in a computing system that may implement the smart routing method 100 of FIG. 7. The computing device 900 may be a laptop computer, a tablet computer, a smart phone, or any number of other devices. The computing device 900 may include a processor 902, which may be a microprocessor, a single core processor, a multi-core processor, a multithreaded processor, an ultra-low voltage processor, an embedded processor, or any other type of processors. The processor 902 may be a part of a system-on-a-chip in which the processor 902 and other components are formed into a single integrated circuit or on a single circuit board.

The processor 902 may communicate with a system memory 904 over a bus 906. Any number of memory devices may be used to provide for a given amount of system memory, including random access memory (RAM), static random access memory (SRAM), dynamic RAM, and the like.

A mass storage 908 may also be coupled to the processor 902 via the bus 906. The mass storage 908 may be included to provide for persistent storage of information and data. The mass storage 908 may be implemented via a solid-state drive (SSD). Other devices that may be used for the mass storage 908 include read only memory (ROM), flash memory, micro hard drives, hard drives, and the like.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may be a proprietary bus, for example, used in a SoC based system, such as in a smart phone, tablet computer, and the like. Other bus systems may be included, such as point-to-point interfaces and a power bus, among others.

The bus 906 may couple the processor 902 to a transceiver 910, for communications with a cloud 912, such as a local network, a wide area network or the Internet. The transceiver 910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group. The transceiver 910 may include a WLAN unit that may be used to implement Wi-Fi™ communications in accordance with the Institute of Electrical and Electronics Engineers (IEEE) 802.11 standard, including 802.11n and 802.11ac. In addition, wireless wide area communications, for example, according to a cellular or other wireless wide area protocol, can occur via a WWAN unit.

A network interface controller (NIC) 914 may be included to provide a wired communication link to a network 912. The wired communication link may provide an Ethernet protocol connection, or may provide a wired communication link that is based on other types of network and interface protocols.

A battery 916 may power the computing device 900, although the computing device 900 may use a power supply that is directly coupled to an electric power grid. The battery 916 may be a lithium ion battery, a metal-air battery, or nickel cadmium battery, among others. A battery monitor/charger 918 may be included in the computing device 900 to charge the battery 916, monitor the charging of the battery 916, and monitor the status of the charge on the battery 916.

A power block 920 may be coupled with the battery monitor/charger 918 to charge the battery 916. In some examples, the power block 920 may be replaced with a wireless power receiver to provide the power wirelessly, for example, through a loop antenna in the computing device 900.

The bus 906 may couple the processor 902 to a display device 922. The display device 922 may be built into the computing device 900, such as an integrated display in a laptop computer, a tablet computer, or a smart phone. In other examples, the display device 922 may be an external device coupled to the computing device 800 through an interface.

An input device 924 may be coupled to the processor 902 through the bus 906. The input device 924 may be a touchscreen panel associated with the display device 922, a keyboard built into the computing device 900, a touchpad built into the computing device 900, an external pointing device, such as a keyboard or a mouse connected to the computing device 900, or any combinations thereof.

A camera interface 926 may be coupled to the processor 902 through the bus 906. The camera interface 926 may couple to a camera 928. A microphone interface 930 may be coupled to the processor 902 through the bus 806. The mass storage 908 may include code modules to implement functionality. A booting module 926 may include start up code to boot the processor 902. An operating system 928 may be included to provide an interface between the user and the computing device 900, and to provide basic operations within the computing device 900. Applications 930 may be included to provide functionality, such as communication applications, word processing applications, and the like.

While the foregoing examples are illustrative of the principles of one or more particular applications, it will be apparent to those of ordinary skill in the art that numerous modifications in form, usage, and details of implementation can be made without the exercise of inventive faculty, and without departing from the principles and concepts described herein. It is intended that the appended claims cover all such modifications and variations as fall within the true spirit and scope of the disclosure.

What is claimed is:

1. A method to route a Wi-Fi signal from a Wi-Fi device, the method comprising:
    scanning a Wireless Local Area Network (WLAN) to identify an Access Point (AP), wherein a plurality of paths exists between wireless devices in the WLAN;
    performing a beamforming operation to measure a connection quality for a first sub-path of the plurality of paths, wherein the connection quality comprises Received Signal Strength Indication (RSSI) and Quality Indication (QI);
    retrieving measured connection quality for a second sub-path of the plurality of paths from a mesh network accessible to the Wi-Fi device;
    calculating the connection quality of a first path, the first path comprising the first sub-path and the second sub-path, wherein the first sub-path is disposed between the Wi-Fi device and the first client and the second sub-path is disposed between the first client and the AP; and
    selecting between the first path and a second path for routing the Wi-Fi signal to the AP.

2. The method of claim 1, further comprising:
    performing a second beamforming operation to measure the connection quality for the second path of the plurality of paths, the second path being disposed between the Wi-Fi device and the AP.

3. The method of claim 1, further comprising:
    obtaining measured RSSI and QI for both a 2.4 GHz band and a 5.0 GHz band.

4. The method of claim 1, further comprising:
    performing a beamforming operation to measure a connection quality for a third sub-path of the plurality of paths;

retrieving measured connection quality for fourth and fifth sub-paths of the plurality of paths from the mesh network;

calculating the connection quality of a third path to a second AP, the third path comprising the third sub-path, the fourth sub-path, and the fifth sub-path, wherein the third sub-path is disposed between the Wi-Fi device and a second client, the fourth sub-path is disposed between the second client and a third client, and the fifth sub-path is disposed between the third client and the second AP; and selecting between the first path, the second path, and the third path for routing the Wi-Fi signal.

5. The method of claim 4, further comprising:

calculating RSSI and QI for the third path at 2.4 GHz and at 5.0 GHz.

6. A Wi-Fi device to establish connection with an Access Point (AP) in a Wireless Local Area Network (WLAN), the Wi-Fi device comprising:

a processor coupled to a memory, the memory comprising stored computer-readable instructions, wherein the computer-readable instructions, when executed, cause the processor to:

beamform in the direction of a first client to measure Received Signal Strength Indication (RSSI) and Quality Indication (QI) of a path between the Wi-Fi device and the first client;

access a mesh network to retrieved measured RSSI and QI for a second path, wherein the second path is disposed between the first client and the AP;

calculate the RSSI and QI of a third path, based on the RSSI and QI of the first path and the second path; and select between the third path and a fourth path for routing a Wi-Fi signal to the AP.

7. The Wi-Fi device of claim 6, further comprising:

a wireless adapter to support operation of the Wi-Fi device in the 2.4 GHz band.

8. The Wi-Fi device of claim 7, further comprising:

a second wireless adapter to support operation of the Wi-Fi device in the 5.0 GHz band.

9. The Wi-Fi device of claim 7, the wireless adapter further comprising:

one transmit radio antenna; and one receive radio antenna.

10. The Wi-Fi device of claim 7, the wireless adapter further comprising:

two transmit radio antennas; and two receive radio antennas;

wherein the Wi-Fi device supports two spatial streams.

11. A method to route a Wi-Fi signal in a Wireless Local Area Network (WLAN), the method comprising:

beamforming in the direction of a first client to measure Received Signal Strength Indication (RSSI) and Quality Indication (QI) of a path to the first client;

retrieving measured RSSI and QI for a second path from a mesh network, wherein the second path is disposed between the first client and an Access Point (AP);

calculating the RSSI and QI of a third path, based on the RSSI and QI of the first path and the second path; and selecting between the third path and a fourth path for routing a Wi-Fi signal.

12. The method of claim 11, further comprising:

beamforming in the direction of a second client to measure RSSI and QI of a fifth path;

retrieving measured RSSI and QI for a sixth path from the mesh network; and calculating the RSSI and QI of the fourth path, based on the RSSI and OI of the fifth path and the sixth path;

wherein either the third path or the fourth path enable the Wi-Fi signal to be routed to the AP.

13. The method of claim 11, further comprising:

beamforming in the direction of a second client to measure RSSI and OI of a fifth path;

retrieving measured RSSI and QI for a sixth path from the mesh network; and calculating the RSSI and QI of the fourth path, based on the RSSI and OI of the fifth path and the sixth path;

wherein the third path enables the Wi-Fi signal to be routed to the AP and the fourth path enables the Wi-Fi signal to be routed to a second AP.

14. The method of claim 11, further comprising:

storing the measured RSSI and QI of the path in the mesh network.

* * * * *